United States Patent [19]

Allen

[11] 4,222,270
[45] Sep. 16, 1980

[54] GYROSCOPE RATE RANGE SWITCHING AND CONTROL SYSTEM

[75] Inventor: Arnold R. Allen, Phoenix, Ariz.
[73] Assignee: Sperry Corporation, New York, N.Y.
[21] Appl. No.: 939,306
[22] Filed: Sep. 5, 1978
[51] Int. Cl.$^2$ ............................................. G01C 21/10
[52] U.S. Cl. .................................... 73/504; 318/648
[58] Field of Search ................ 73/504, 178 R; 74/5.4; 340/187; 318/648

[56] References Cited

U.S. PATENT DOCUMENTS

| | | | |
|---|---|---|---|
| 4,062,004 | 12/1977 | Roantree et al. | 340/187 |
| 4,063,141 | 12/1977 | Levine | 318/648 |

*Primary Examiner*—Jerry W. Myracle
*Attorney, Agent, or Firm*—Howard P. Terry

[57] ABSTRACT

In a digital strapped down inertial reference system, a plurality of strapped down, force-rebalanced rate sensors is used to sense aircraft body rates, wherein each gyroscope pick-off signal is fed back to a gyro torquer in a manner to maintain the pick-off signal essentially nulled, the torquer currents thus being proportional to sensed aircraft rates. A precision digital count proportional to the effective current supplied to the torquer is achieved by using a high frequency clock to quantize a lower frequency square wave which has been pulse width modulated in accordance with the gyro pick-off signal and by means for enabling a digital counter synchronously with the state of that square wave. The same high frequency clock signal is used to derive the counter's clock frequency, the counter output being the digital equivalent of the analog square wave which corresponds to the currents supplied to the gyro torquer. Precision currents for supply to the gyro torquer in accordance with the pulse width modulated square wave are achieved by using guard bands which account for the rise and fall times of such currents and the precision turn on and turn off characteristics of VMOS transistor power switches. An automatic rate range switching and control system controlled from the precision digital count adapts the full range cability of the gyroscopic rate sensor to a range consistent with the precision range of the analog-to-digital conversion apparatus.

13 Claims, 7 Drawing Figures

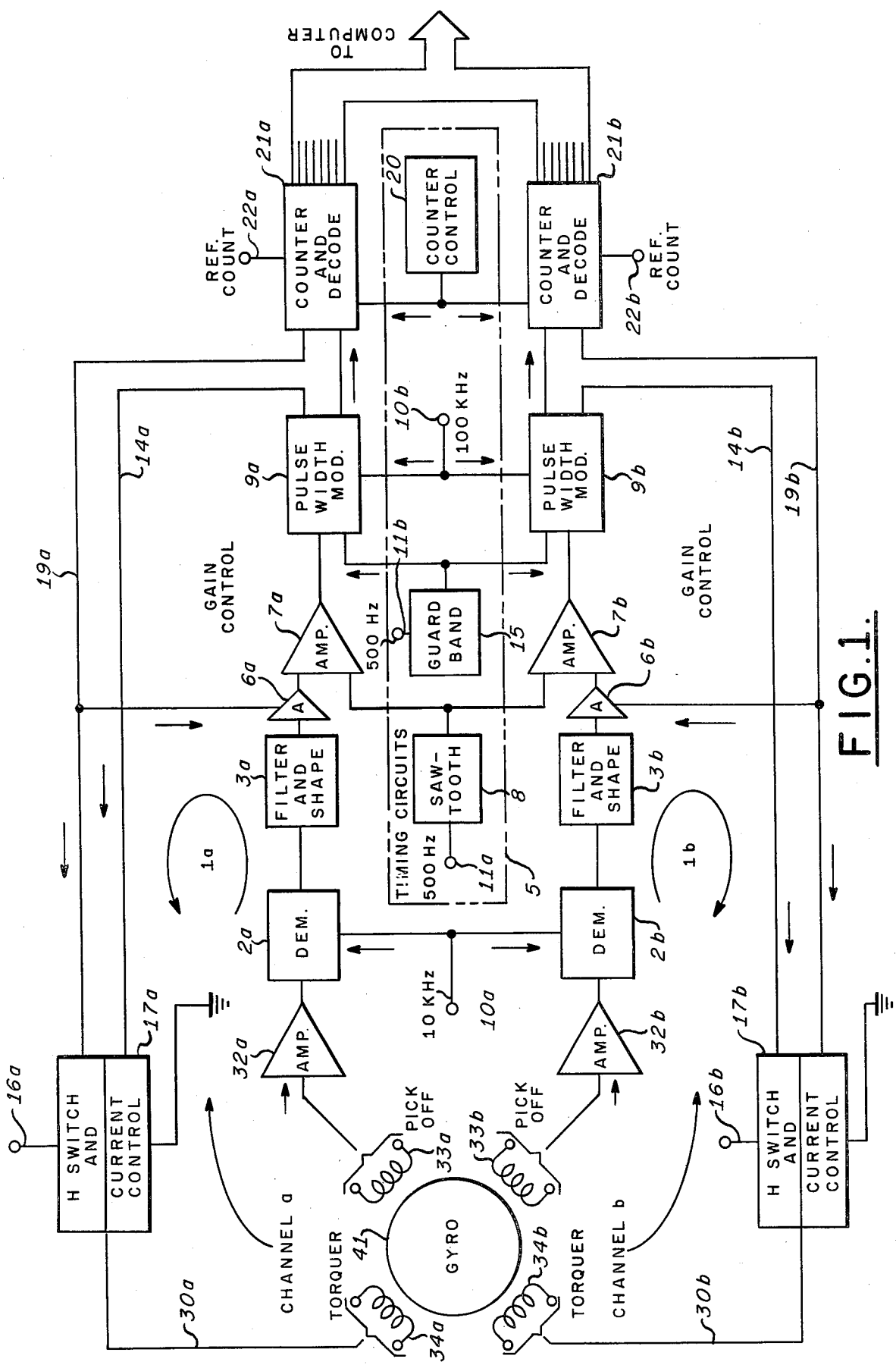

GYROSCOPE RATE RANGE SWITCHING AND CONTROL SYSTEM

BACKGROUND OF THE INVENTION

1. Field of the Invention

The present invention relates generally to gyroscopic reference systems of the type including a plurality of strapped down, force-rebalanced gyroscopic rate sensors for measuring craft rotation rates about primary craft axes, together with a system for computing from such measures aircraft stabilization and attitude data. A typical strapped down system is disclosed in the copending U.S. application Ser. No. 907,228, filed on May 18, 1978 in the names of M. Klemes and D. Duncan and entitled "Strapped Down Attitude and Heading Reference System for Aircraft Employing Skewed Axis Two Degree of Freedom Rate Gyros" and assigned to Sperry Rand Corporation. More specifically, the invention relates to pulse width torque feed back apparatus for supplying precision currents to the gyro torquer and for supplying a corresponding precision pulse count proportional thereto and therefore to aircraft rates for use in the digital computation of the stabilization and attitude data. The apparatus further includes improved rate range switching arrangements.

2. Description of the Prior Art

Strapped down gyroscopic inertial reference apparatus for aircraft and space vehicles is well known to those skilled in the art of gyroscopic aircraft control systems; many rate gyro configurations and control systems based thereon have been described extensively in the literature. In general, such systems include a plurality of rate sensors strapped down to the vehicle for measuring the angular velocity of the vehicle about its primary axes, which measure, along with vehicle acceleration and heading measures, is supplied to a digital computer to provide output data for use in stabilization, control, navigation, or guidance of the aircraft. Since the gyros are strapped to the airframe, the rate sensors are preferably of the force or torque rebalancing type; that is, the gyro is maintained substantially aligned with its support case by feeding the gyro pick-off signal back to the gyro torquer in a manner to maintain the pick-off signal value essentially null, the torquer current so required being a measure of the rate being sensed by the rate gyro. Typical two-degree-of-freedom rate sensors of this type are disclosed in the T. R. Quermann U.S. Pat. No. 3,529,477 for a "Gyroscopic Rotor Suspension", issued Sept. 22, 1970 and in the C. G. Buckley, J. A. Kiedrowsky U.S. patent application Ser. No. 818,486, filed July 25, 1977 for a "Permanent Magnet Torquer for Free Rotor Flexure Suspended Gyroscopes", both inventions being assigned to Sperry Rand Corporation. It will be appreciated that the ultimate output of the gyroscopic rate sensor must be compatible with the requirements of available digital computer techniques.

Prior art arrangements have been used to convert the torque feed back signals of a force rebalanced sensor into a form compatible with digital computation techniques, such as, for example, by using a voltage-to-frequency conversion technique or by using pulse width modulation techniques. The present invention utilizes the latter technique. One prior art pulse width modulation type of torque feed back control for an inertial sensor of which Applicant is aware is disclosed in U.S. Pat. No. 4,062,004 to Roantree et al for "Dual Range, Torque Rebalancing of Inertial Sensor", issued Dec. 6, 1977. The over-all function of the Roantree device is similar to that of the present invention; that is, to derive a pulse count in accordance with the feed back current supplied to the sensor torquer and hence in accordance with the sensed inertial parameter and also to provide for both low range and high ranges of operation.

There is a need for retaining at least the ability of the prior art to provide a precise digital measure of the sensed parameter and also to accomplish the measurement more economically in terms of hardware complexity, reliability, and cost. In the prior art, the quantizing pulses are counted up or down depending upon whether the pulse width modulated square wave produces positive or negative feed back currents for the sensor torquer; that is, the counter counts negatively during the first half cycle of the ramp frequency after the gyro signal is compared with the ramp, or it counts positively during the second half cycle before such comparison. A disadvantage of using this technique is that it requires an up-down counter, which is larger and more expensive than a simple one way counter and requires more complex logic circuits. Also, the prior art does not account for the effects of finite rise and fall times or for any over-shoots of the current supplied to the torquer or in controlling his counter. Accordingly, the counter output may not precisely represent the actual torque applied to the gyro and the resulting rate measure. In the Roantree patent, high-low mode detection and switching is based on the state of a clocked comparator output responsive to the gyro error signal, with respect to high and low rate strobe pulses. Also, since high-low determination is performed every ramp cycle, it necessitates hardware hysteresis or a time delay provided by a pulse delaying counter. Furthermore, the current supplied to the gyro torquer in this high rate mode may not be accurate, as it includes the uncertainties associated with the off-set voltages of an on-state switching device.

SUMMARY OF THE INVENTION

The present invention is an improvement in a pulse width modulation type of analog-to-digital conversion apparatus useful in strapped down inertial gyroscope reference systems which utilize plural force-balanced gyro rate sensors for sensing aircraft body rates about principal craft axes wherein gyro torquer feed back currents are maintained precisely proportional to sensed craft body rates and a precision digital count proportional thereto is desired. The invention incorporates a digital counting technique for providing a precision digital count proportional to the current supplied to the torquer. Such a count is generated by using a high frequency clock to quantize a lower frequency square wave that has been pulse width modulated in proportion to the amplitude of the corresponding gyroscope error signal, the square wave determining the magnitude of the zeroing feed back currents supplied to the gyro torquer coil. The one-way digital counter is synchronously enabled by the same square wave and because it uses the same high frequency clock to provide a counter clocking frequency, that counter output, compared with a reference count, is the desired digital number corresponding to the currents supplied to the gyro torquer and hence corresponding to the sensed rate. The precision currents supplied to the gyro torquer are controlled by a VMOS power switching transistor circuit. Adverse effects of any transients associated with the rise and fall of the pulse width modulated square wave currents, particularly at the positive and negative extremes, are eliminated by the use of pairs of guard band pulses at the beginning and end of the modulator duty cycle that are used predictably to control the rise and fall of the torquer currents and to blank the counter, thereby eliminating any count uncertainties at the switching times and assuring that erratic torquing transient current is not supplied to the torquer. Another feature of the invention lies in means for deriving the high and low range torquer commands from the digital count, rather than directly from the gyro pick-off signal as was done in the prior art. While the invention is described for use in a system in which the sensors are rate gyroscopes, it will be clear to those expert in the art that the scope of the invention includes its application to other devices, such as in inertial accelerometers.

BRIEF DESCRIPTION OF THE DRAWINGS

FIG. 1 is a block diagram of a typical two axis, torque rebalanced rate gyroscope including the novel pulse width modulated torque rebalance system of the present invention and illustrates the basic components thereof and their electrical interconnections.

DESCRIPTION OF THE PREFERRED EMBODIMENTS

Figure 2A:
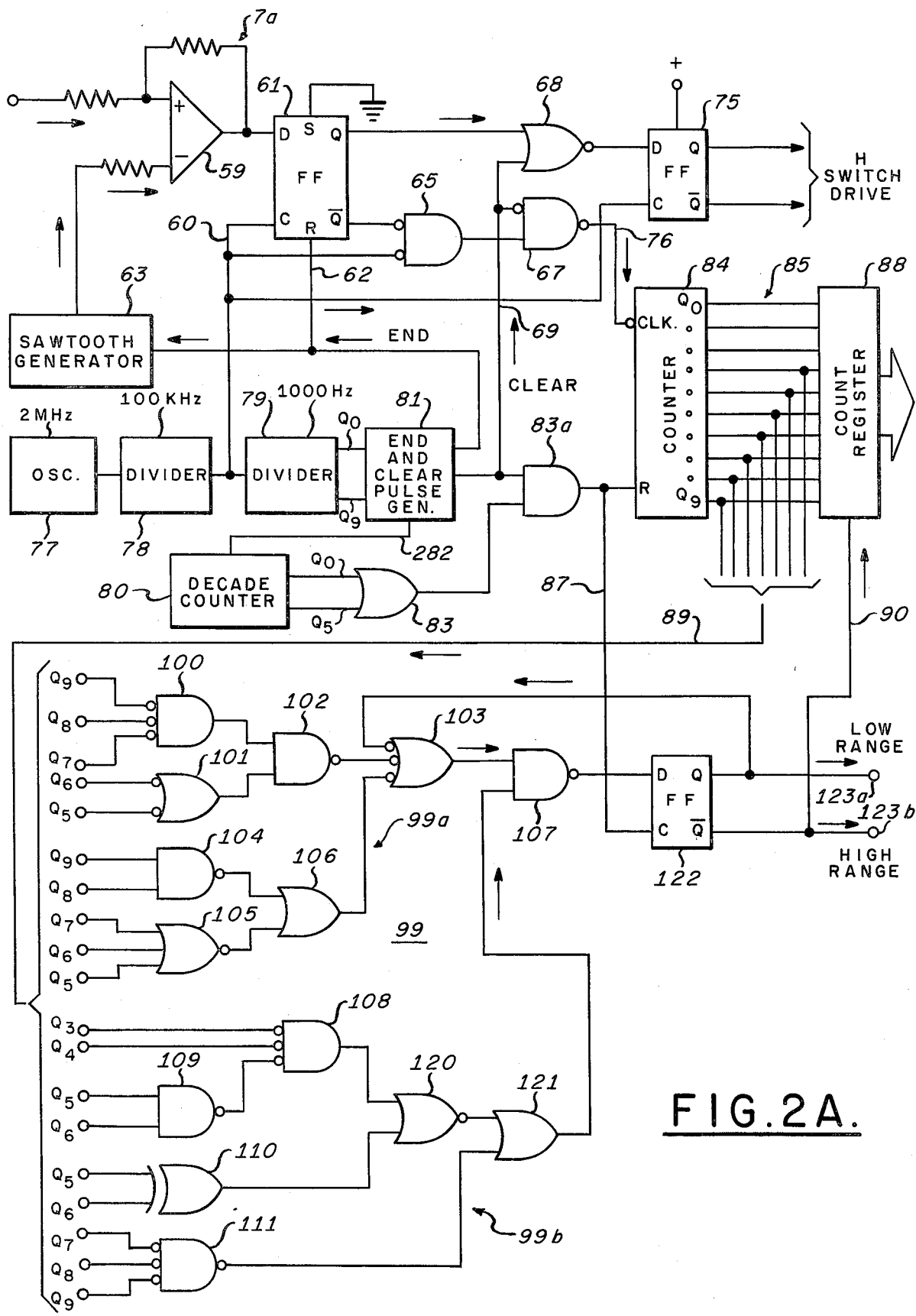
FIGS. 2A and 2B provide a detailed schematic diagram of the system of FIG. 1.

The present invention is used for providing a precision measure of aircraft rates, operable in either low or high range modes, and for converting such measures into digital data for use in an aircraft digital strapped down attitude and heading reference apparatus. The rate gyroscopes of such apparatus may be dual axis, torque feed back, flexure suspended gyroscopes of the general kind described in the aforementioned patent disclosures, these documents disclosing the structure and operation of typical flexure rate gyroscopes. Such gyroscopes are characterized by having a gyroscopic rotor tht is, in effect, freely suspended by flexure support members for spinning about a spin axis by means of an electric-motor-driven shaft journalled in the instrument casing. Universal tilting of the gyroscope rotor about a pair of axes perpendicular to the normal spin axis is permitted by the flexure support.

Such gyroscopic instruments are normally supplied with 90° spaced-apart pairs of inductive pick-offs for detecting angular displacement of the rotor with respect to its spin axis about mutually perpendicular inertial axes. Cooperating quadrature-spaced pairs of similarly disposed torquing coils are also normally present. In FIG. 1, the gyroscope and its coils are as a matter of convenience schematically illustrated, the pair of torquer coils being represented by respective single torquer coils 34a, 34b and the pair of inductive pickoffs by respective single pick-off coils 33a, 33b. Normally, the signal from pick-off coil 33a, for example, is kept at null by passing it through buffer amplifier 32a ultimately into torquer coil 34a to precess the gyroscope rotor 41 opposite to the precession caused by the input rate, thus keeping the axis of rotor 41 essentially aligned with the instrument and motor casing (not shown), which case is affixed to the craft. As described in the aforementioned patents, rotor 41 is flexibly mounted on a drive shaft and is spun by a motor inside of the instrument casing. In a similar manner, the signal from the quadrature pick-off coil 33b, is nulled through the gyro restoring loop including buffer amplifier 32b ultimately flowing into torquer coil 34b. It will be recognized, therefore, that the current driven into either torquer coil 34a or 34b is proportional to the rate at which the gyroscope casing is being rotated as the craft itself correspondingly rotates about its respective inertial axes. As the craft on which the gyroscope is fixed rolls, for example, the gyroscope rotor 41 is maintained substantially fixed with respect to its casing by precessing the rotor 41 in roll at the same rate that the craft is rolling. Consequently, craft roll rate, for example, can be precisely measured if the currents passing through the corresponding torquer coil 34a or 34b are accurately measured.

In what follows, it will be understood by those skilled in the art that the control systems respectively associated with the two inertial axes are duplicates. The gyroscope rotor position-restoring system including loop 1a uses tilt signals derived with respect to one axis by pick-off coil 33a to supply precession signals via lead 30a to the corresponding axis torquer coil 34a. Similarly, the gyroscope rotor restoring loop 1b uses tilt signals derived with respect to the quadrature axis by pick-off coil 33b to supply precession signals via lead 30b to the quadrature axis torquer coil 34b. It will be apparent that the two cooperative loops 1a and 1b are similar; therefore, only the loop 1a requires detailed discussion.

Figure 2B:
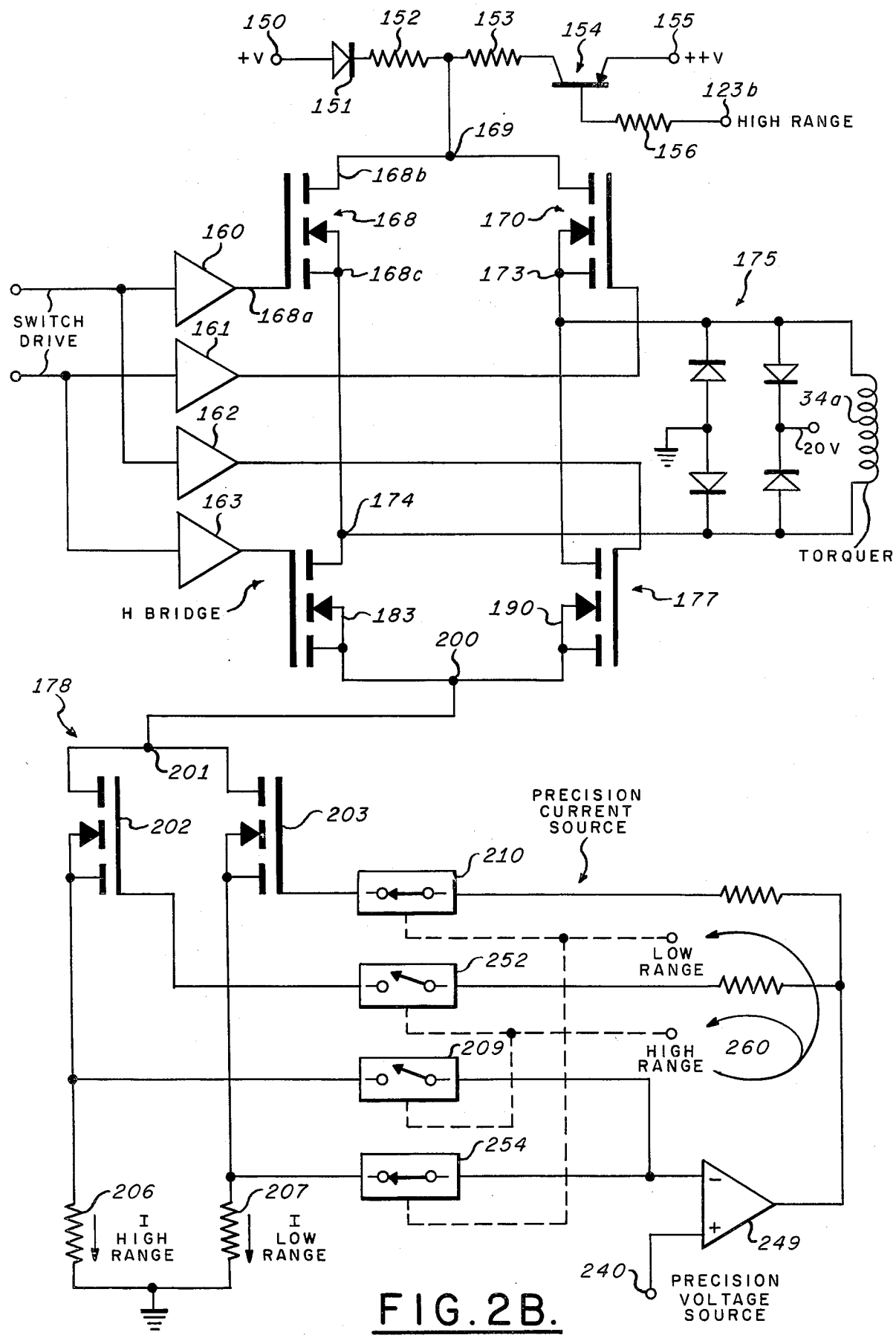

FIG. 1 represents a simplified block diagram of the invention, discussion of which will be of material aid in the consideration of the details of the invention, as will be further presented in connection with FIGS. 2A and 2B. The error signal detected by pick-off 33a is coupled through buffer amplifier 32a to one set of inputs of demodulator 2a. Demodulator 2a, as well as demodulator 2b, is provided from a source (not shown) coupled to terminal 10a with a constant amplitude reference square wave having a 10 KHz frequency, for example, which is also the excitation signal for pick-offs 33a, 33b. The gyro drive motor may be driven from a 400 Hz signal source (not shown). The variable polarity direct current output error signal of demodulator 2a is coupled to one input of amplifier 7a through a conventional filter and shaping network 3a and a variable gain amplifier 6a. Similarly, the variable polarity, direct current output error signal of demodulator 2b is coupled to one input of amplifier 7b through a similar filter and shaping network 3b and a variable gain amplifier 6b. If the axes of the gyroscopes are skewed with respect to the craft axes to enhance stability, as described in the above-noted application, it will be understood that the error signal outputs of demodulators 2a, 2b may first be subjected to a conventional cross axis compensation process involving filter and shaping networks not discussed because it is not necessarily pertinent to the present invention. With further respect to loop 1a, for example, the output of demodulator 2a is supplied as one input to amplifier 7a, an amplifier connected as a conventional comparator for comparing the first input level to the instantaneous level of a repetitive ramp or saw tooth voltage coupled to the second input of amplifier 7a from a source 8 yet to be described, which saw tooth wave, in the illustrated embodiment, has a 500 Hz repetition frequency and is supplied from timing circuits designated generally at 5.

The output of comparator 7a is coupled to pulse width modulator circuit 9a which is also supplied from a clock source (not shown), coupled to terminal 10b of the timing circuits 5. In the illustrated embodiment, the clock pulses are supplied at a 100 KHz rate, and are used to quantize the pulse width modulated square wave as will be described more fully. The output of circuit 9a serves two purposes. It is fed directly via lead 14a to a switching device 17a which will be identified herein as an H switch, which signal determines the conducting and non-conducting status of the individual elemental switches making up H switch 17a, as will be further described especially in connection with FIG. 2B. The H switches 17a and 17b are supplied with suitable reference inputs 16a and 16b coupled to undirectional voltage sources (not shown) which, under control of signals on lead 14a, provide a source of torquing currents to be appled to gyro torquer coils 34a and 34b.

The output of pulse width modulator 9a is also supplied to a counter and decoder 21a, whose second input is supplied with counter control pulses from couner control 20 of the timing circuit 5. Counter 21a cyclically counts the quantizing pulses corresponding to the loop 1a analog rate signal, holding such data for entry into a conventional digital computer (not shown), for example, coupled to the output of counter 21a, as controlled by the computer input interface. It will be noted that counter 21a is a simple one-way counter and that the clock pulses are counted only during the positive portion of the quantized square wave, as will be explained. Thus, a reference count on terminal 22a is supplied to the counter-decoder 21a which corresponds to one half the total count representing the saw tooth duty cycles, the measured count being subtracted from the reference count to provide a count proportional to the sensed aircraft rate. Alternatively, the decoder portion of the counter-decoder 21a is used to determine the rate range mode of operation of the invention.

In accordance with the present invention, guard band pulses from a source 15 synchronous with the 500 Hz duty cycle are provided to achieve precision control of the H switches 17a and currents supplied thereby as well as corresponding precision control of the quantizing pulses supplied to counter 21a. As will be described in more detail, these pulses are used to compensate for inaccuracies otherwise associated with the finite rise and fall times and possible over-shoot characteristics of the torquer currents and to assure that the pulses supplied to the counter faithfully represent the effective currents applied to the gyro torquer. In accordance with a further aspect of the present invention, the inclusion of the guard band pulses provides a time interval synchronous with the 500 Hz duty cycle during which it is determined by decoding circuits 21a responsive to the counter contents whether the control loop should switch to a high rate mode from a low rate mode or vice versa which, in turn, determines whether high or low current sources are switched by the H switch 17a. This is illustrated schematically in FIG. 1 by lead 19a connecting the counter-decoder 21a for supplying the high-low mode command to the H switch. Also, the high-low signal on lead 19a controls the gain of the gyro pick-off signal through variable gain amplifier 6a to assure that the over-all closed loop gain and loop stability remain the same in both modes of operation.

It will be apparent that the loop 1b associated with pick-off 33b and the torquer 34b is substantially identical in structure and operation to that associated with loop 1a, pick-off 33a, and torquer 34a with respect to its cooperation with gyro rotor 41 and does not therefore require further detailed discussion. For example, the H switch 17b is controlled by signals on lead 14b and 19b, the latter determining whether a low range or a high range torquing signal is applied to torquer coil 34b. Also, counter and decoder 21b cyclically collects counts corresponding to the loop 1b analog rate signal, accumulating such counts for rate range decoding and conveying the count to the digital computer or other data processor unit for conventional use in stabilization, control, navigation, or guidance of the craft.

As noted, the low range is the normal mode. As will be further described, the diagonally opposed switch elements of the H switches are open and closed simultaneously and instantaneously in accord with the respective positive and negative areas of the pulse width modulated square wave as controlled by the signals on leads 14a and 14b. For example, if the input rate signal to comparator 7a is zero, the diagonally opposed switches of H switch 17a will be conducting and non-conducting for equal lengths of time. As a consequence, the net torque applied to the gyro torquer 34a is then zero.

A detailed illustration of the pulse width modulation torque rebalance gyro control of the present invention lying, for instance, between the comparator 7a and lead 14a of FIG. 1 and of associated timing elements 5 is provided in FIG. 2A, while a similar illustration of the H switches and current control 17a is provided in FIG. 2B. The apparatus of FIG. 2A employs as an input the demodulated signal from gyro pick-off 33a and yields an output signal for operation of the H switch 17a of FIG. 2B.

The system timing reference comprises a stable oscillator 77 which supplies a fixed frequency pulse train at a frequency, which in the illustrated embodiment is 2 MHz, to a conventional divider circuit 78. Divider 78 yields a 100 KHz pulse train signal, which pulse train is illustrated at C in FIG. 3 and serves as the 100 KHz system clock or quantizing frequency. The pulse train C output of divider 78 is applied to a further divider 79 that divides the quantizing frequency again to form a signal of 1000 Hz, for example. This signal is used to derive a pulse width modulation frequency of 500 Hz, for example, which establishes the system duty cycle, as is seen in connection with waves A and B of FIG. 3. The 100 KHz output (wave C) of divider 78 is also supplied via lead 60 to apparatus yet to be described, where it serves several timing and control functions.

The divided-down output wave train of divider 79 is applied to the guard pulse generator 81 (15 of FIG. 1) to generate end and clear pulses, as will be described in further detail with respect to FIGS. 4A and 4B. The pulse width modulation signal first triggers the end pulse generator circuit of generator 81, yielding a constant repetition frequency pulse train of predetermined width for application to a conventional saw tooth generator 63 for controlling that circuit so as to end its rise time excursion and then to start a new excursion, illustrated in FIG. 3 as saw tooth wave form A. The end pulses of wave D are, in the present embodiment, 100 microseconds wide, occurring at a 500 Hz repetition rate. In other words, the guardband end pulse serves to reset the saw tooth generator 63 every cycle.

The output of sweep generator 63 is coupled to one input, polarized as shown in FIG. 2A, of operational amplifier 59 (7a of FIG. 1). To a second polarized input, as shown in FIG. 2A, is applied the gyroscope error signal from demodulator 2a. An exaggerated decreasing gyro error is illustrated by dashed line S in FIG. 3. Operational amplifier 59 is connected via an associated resistance network of conventional nature so that it operates in a well known manner as a comparator device. The output of the comparator is therefore the pulse width modulated wave B of FIG. 3 for a particular value of the gyro pickoff signal S.

Thus, if the gyro pick-off signal is zero, the output of the comparator will be a square wave having substantially equal amplitude positive and negative periods, which ultimately control equal positive and negative currents to the gyro torquer through the H switches and a net zero torquing of the gyro. If the gyro signal calls for a maximum positive or a maximum negative torquer current, the pulse width will be maximum positive or maximum negative for the full duty cycle thereof, still as modified by the guard band pulses. However, due to the normal pulse width modulation duty cycle operation, there will inherently occur transients in the torquer current wave forms, either at the beginning (full negative) or at the end (full positive) of the duty cycle. Since the digital counter is not a forcing device, but is simply a following device and since it, in effect, is measuring the current supplied to the torquer coil, it is important that the currents to the torquer be metered with precision, most particularly at the positive and negative pulse width modulation duty cycle extremes, and that, also at these extremes, the counter is disabled so as not to be allowed to count during the current transients present at these extremes.

In accordance with the present invention, guard band pulses are generated which serve to control the H switches in such a way as to control effectively the torquer current wave form in a predictable manner, similarly to control the digital counter and to assure that range switching occurs at a predetermined predictable time so as to minimize any torque current transients.

The guard band pulses effectively limit the maximum positive torquer current to 90 percent or less of the pulse width modulation duty cycle and limit the maximum negative torquer current to 10 percent or more of the duty cycle. In the present invention, only positive currents are counted, this being made possible by the guard band technique because of the precision with which both positive and negative torquer currents are controlled. Furthermore, as will be described, the guard band technique permits the count accumulated in the counter to be used to determine the system high-low rate range modes of operation.

The square wave output (curve B) of comparator amplifier 59 is coupled to the data terminal D of a conventional type D flip-flop 61, while the quantizing wave train C is coupled via lead 60 to its clock terminal C. Therefore, the Q and $\overline{Q}$ outputs of flip-flop 61 are synchronized with the rising edges of the clock pulses. However, in accordance with this invention, on of the guard band pulses, the end pulse wave D, from pulse guard band pulse generator 81 is coupled via lead 62 to the reset terminal of flip-flop 61. The presence of this end pulse inhibits any continued quantization of the pulse width modulated square wave B. Because flip-flop 61 is synchronously reset by the end pulses, the current passed through the gyro torquer will be unconditionally and predictably driven negative during each end pulse period, the duration of the end pulse being as such to limit the positive current supplied to the torquer to 90 percent or less of the pulse width modulation duty cycle. Also, as will be described, the counter clocking pulses passed to counter 84 are inhibited or blanked during the end pulse period.

In FIG. 2A, the Q output of flip-flop 61 is supplied directly to one input of NOR gate 68, whose output is applied to the D input of flip-flop 75. The $\overline{Q}$ terminal output of flip-flop 61 is fed to an inverting input of AND gate 65, whose second inverting input receives the quantizing clock pulse train on lead 60. The guard band pulse generator 81, responding to the 1000 Hz output of divider 79, also generates a second guard band pulse, identified herein as the clear pulse (wave E of FIG. 3), the rising edge of which corresponds in time with the falling edge of the end pulse (wave D). The duration of the clear pulse E is preferably equal to that of end pulse D and serves to limit the negative current supplied to the torquer to 10 percent or more of the pulse width modulation duty cycle. The clear pulse E from generator 81 is coupled via lead 69 to a second input of NOR gate 68. Further, the clear pulse on lead 69 is also supplied to an inverting input of gate 67. Thus, the clear pulse serves ultimately to blank the finite transitional rise period of the torquer current and inhibits the flow of count pulses via gate 67 and lead 76 into counter 84 during the brief interval (100 microseconds) of the clear pulse of wave E. Accordingly, a predictable blanking period is provided synchronously during each of the torquer current rise and fall times at the extremes of positive or negative torquing commands. The existence of the blanked interval is readily accounted for in the output of counter 84, as will be described, since no pulses are gated into the counter during the guard band pulse periods by gate 67. Further, as will become apparent, the rise and fall times of the torquer current flowing through H switch 17a into torquer coil 34a are readily made equal by using conventional design considerations so that these effects cancel, yielding zero net torquer current during each blanked interval.

To make clear the functions of remaining parts of the signal processing part of the circuit, it is to be noted from FIG. 2A that NOR gate 68 with its inverting output serves to OR the duty cycle signal from the Q output of flip-flop 61 with the clear pulse from generator 81. The clear pulse serves in this part of the circuit to limit the minimum value of the duty cycle of wave B to 10 percent. The output of NAND gate 67 is used to increment counter 84 at the 100 KHz rate whenever the clear pulse is zero and the Q output of flip-flop 61 is a one. The AND gate 65 is used to allow the 100 KHz clock signal on lead 60 to gate AND gate 67 only when the $\overline{Q}$ output of flip-flop 61 is a zero, a state which corresponds, by definition, to a positive torquer current; i.e., the counter 84 counts only during positive pulse width modulation periods, which count is compared with a reference count representing one-half the effective pulse width modulation duty cycle to provide a count proportional to positive and negative torquer currents.

Figure 4A:
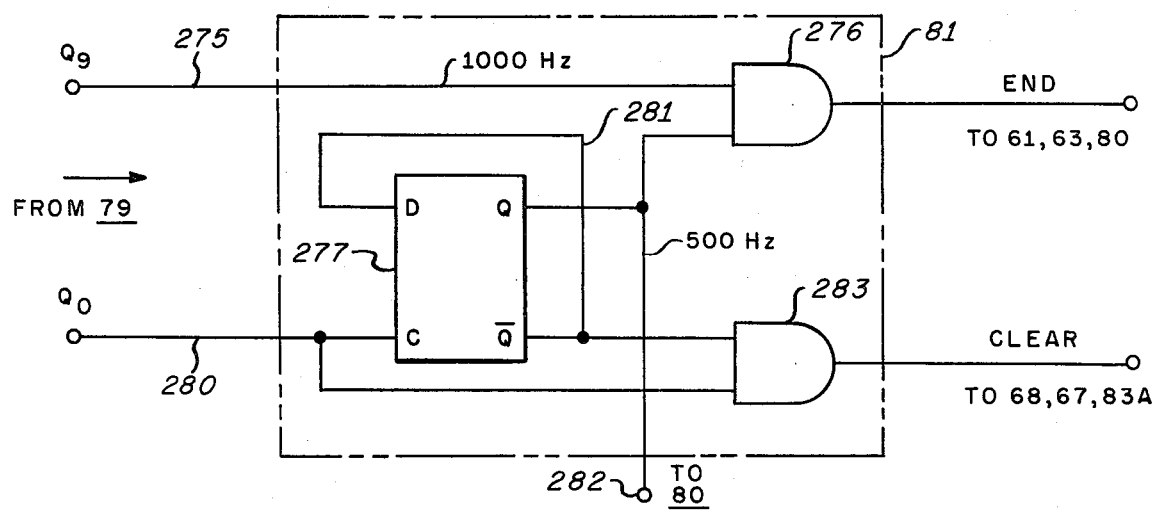
FIG. 4A is a detailed wiring diagram of the end and clear pulse generator of FIG. 2A.
Figure 4B:
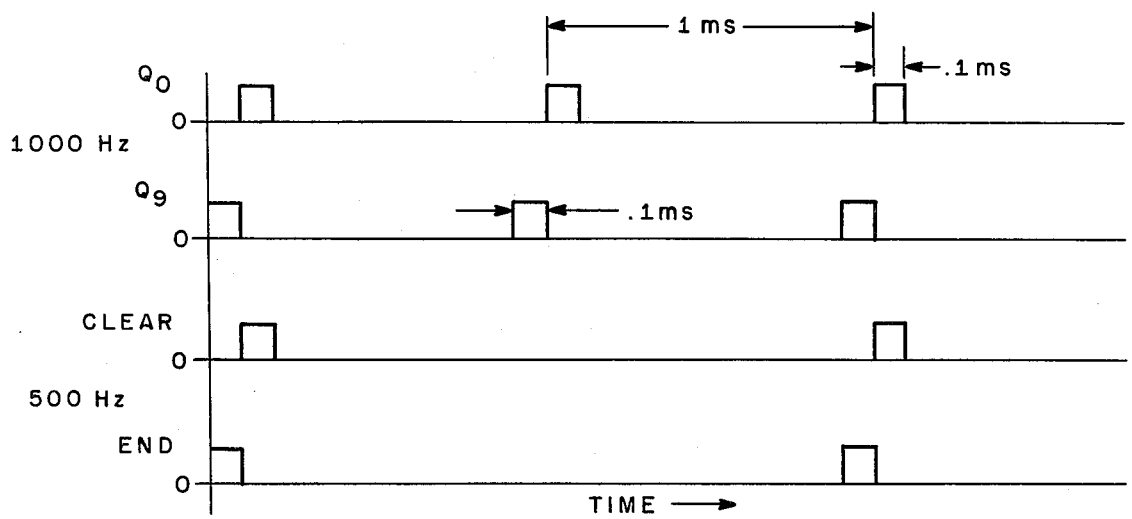
FIGS. 4B and 5 are graphical illustrations of electrical wave forms useful in explaining the operation of the invention.

With respect to the details of operation of the guard band pulse generator 81, which will now be considered with respect to FIGS. 4A and 4B, and $Q_0$ and $Q_9$ outputs of divider 79, which may be a conventional decade counter, are supplied as inputs to generator 81. The $Q_0$ input on lead 280 is applied to the C input of flip-flop 277; the data input D (500 Hz) is supplied via lead 281 from the $\overline{Q}$ output of flip-flop 277. AND gate 276 uses $Q_9$ inputs from lead 275 and the Q output of flip-flop 277. AND gate 283 has two inputs, the $Q_0$ signal on lead 280 and the $\overline{Q}$ output of flip-flop 277. Since flip-flop 277 inherently operates as a divide-by-two device, the 1000 Hz $Q_0$ and $Q_9$ inputs are readily transformed into the desired 500 Hz pulses to decode counter 80 via lead 282, the clear and end pulses having the desired 500 Hz repetition frequency and the phase relation shown in FIG. 4B. The device of FIG. 4A is responsive as in FIG. 4B to 1000 KHz and 500 Hz input signals for providing a pulse of 0.1 milliseconds duration at the beginning of each two millisecond cycle. The circuit also produces the end pulse, also 0.1 milliseconds wide, which ends the two millisecond cycle.

Figure 5:
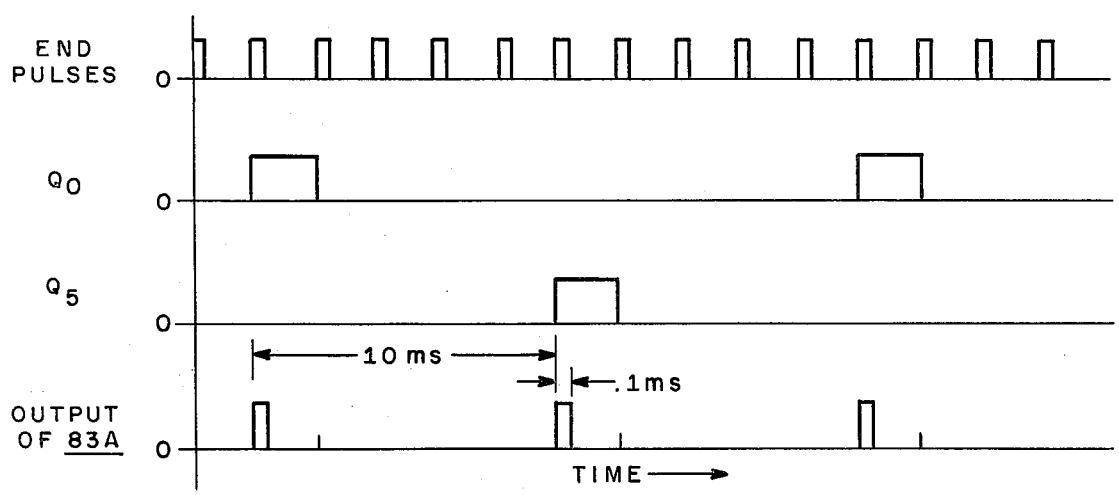

With respect to the nature of counter 84, it accumulates all 100 KHz clock pulses passed by gate 67 whenever the clear pulse on lead 69 is a zero for a predetermined number of cycle times, for example, five cycle times. For this purpose, it also employs the decade counter 80 driven by the output of generator 81 which, in the embodiment being discussed, is a 500 Hz pulse train. Counter 80 may be a divide-by-ten device so that its output is a 50 Hz pulse train for $Q_0$ and a 180 degree phase shifted 50 Hz pulse train at $Q_5$. The $Q_0$ and $Q_5$ outputs of decade counter 80 are coupled to inputs of OR gate 83, timed as in FIG. 5 (note that the time scales of FIGS. 4B and 5 differ considerably). AND gate 83a supplies reset pulses to counter 84 every 10 milliseconds, the counter outputs being coupled through connector matrix 85 to corresponding inputs of a conventional register 88, the contents of which are appropriately shifted out when requested by the system computer interface in a conventional fashion. In accordance with the present invention, the $Q_3$ through $Q_9$ outputs of counter 84 are connected via multi-conductor cable 89 to corresponding inputs of a range selection gate matrix 99 having discrete sections 99a and 99b, which gate matrix outputs are also sampled every five cycles by means of the gate 83a output on lead 87. Thus, counter 84 cyclically accumulates clock pulses occurring in five successive system cycle times. At the end of each five system cycle times, the outputs of counter 84 are transferred in the conventional manner to count register 88 and the counter 84 is reset by the reset pulse at its R input from gate 83a. Simultaneously, the gate 83a output on lead 87 is applied to the C input of the conventional type D flip-flop 122 for the range selection control.

In accordance with the invention, range selection gate matrix 99 serves to provide a high-low range mode signal to counter register 88 and control signals to range selection flip-flop 122. The decoding logic system 99a and flip-flop 122 determine when the H switch current range change from the low to the high current range is required. The low range is the normal condition, being used when the measured gyro sensor rates are between ±10 degrees per second, for example. High range torquer currents may accommodate sensor rates up to ±80 degrees per second, for example. It will be understood that the selected operating ranges may be scaled to satisfy the specific characteristics of the gyro sensors, the type of aircraft et cetera.

Figure 3:
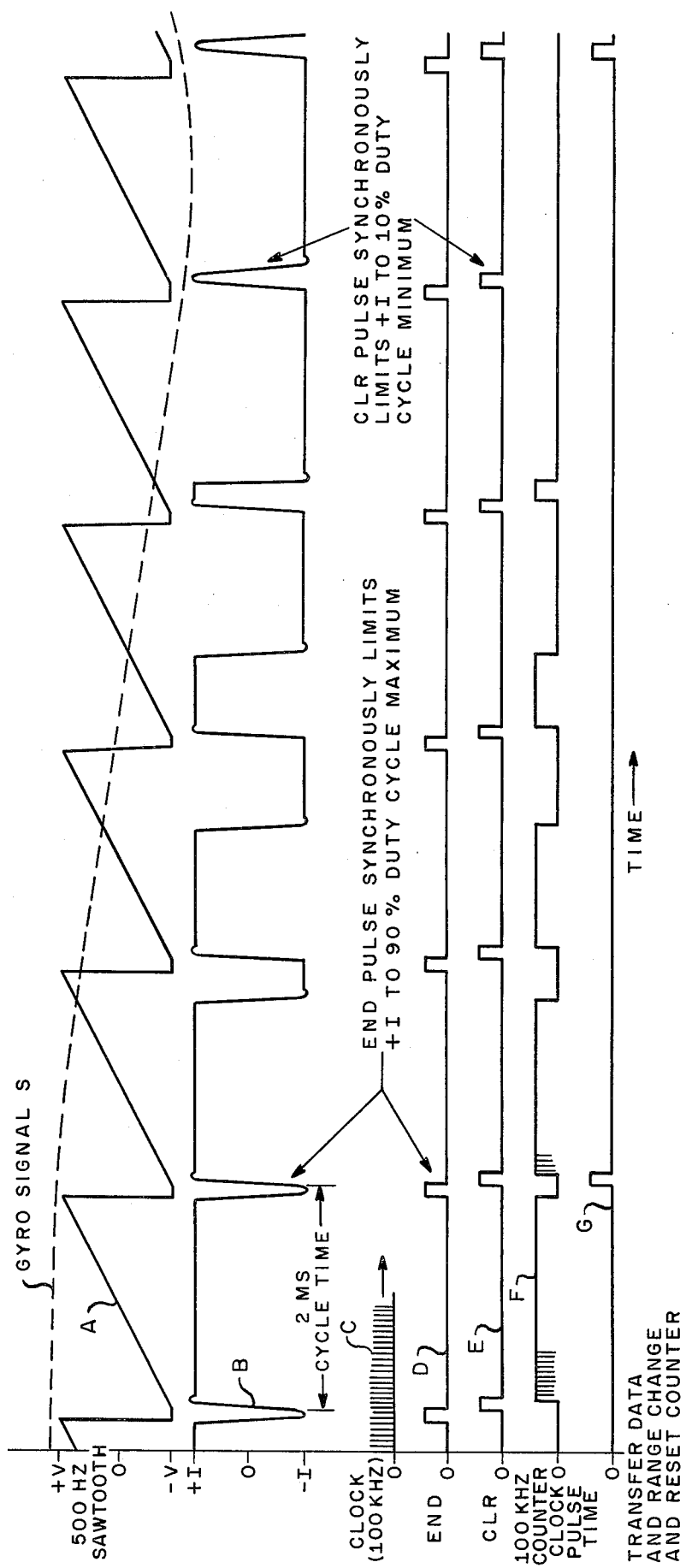
FIG. 3 presents graphical illustrations of pertinent electrical wave forms useful in explaining the operation of the invention.

In accordance with the invention, it will be evident that flip-flop 122 is clocked synchronously, according to wave form G of FIG. 3 (output of gate 83a of FIG. 5) every ten milliseconds to select the appropriate range. This timing allows proper torquing currents to flow by changing the current source range only during the blanked rise time of the torque current. In this manner, no unwanted, uncalibratable, or transient currents are injected into the torquer circuit during transitions from one current range to another.

The H switch 17a shown in FIG. 2B cooperates with the apparatus of FIG. 2A as shown generally in FIG. 1. It will be understood that the H switch 17b operates in a similar manner. In FIG. 2B, there are presented two bridge-like circuits 177, 178 coupled in series at junctions 200 and 201 between reference current sources and ground to form the total H switch 17a, for example. In normal, or low range operation, the +V signal at terminal 150 is coupled through diode 151 and resistor 152 to tap 169 of the bridge-like circuit 177. In the high range mode, the high range signal from terminal 123b of FIG. 2A is coupled through resistor 156 to the base of transistor 154 so that current from + +V terminal 155 additionally passes through transistor 154 and resistor 153 to junction 169. The +V and + +V signals are supplied by conventional power supplies (not shown). The active semiconductor elements 168, 170, 183, 190 are conventional N-channel enhancement-mode power MOSFET devices of the VMP-21 type manufactured by Siliconix, Inc., 2201 Laurelwood Road, Santa Clara, California. Such devices are often used as switches where high input impedance and very fast switching times are desired. MOSFET devices 168 and 190, when closed, provide a closed circuit from voltage source +V or + +V upward through torquer coil 34a to junction 200; MOSFET devices 170 and 183 when closed, provide a closed circuit from voltage source +V or + +V downward through torquer coil 34a to junction 200.

The Q output of flip-flop 75 (FIG. 2A) is coupled through buffer amplifier 160 to the gate of MOSFET 168, while the same Q output is coupled through buffer amplifier 162 to the gate of the diagonally opposed MOSFET 190; the $\overline{Q}$ output of flip-flop 75 is similarly coupled through buffer amplifier 161 to the gate of MOSFET 170, while the same $\overline{Q}$ output is coupled through buffer amplifier 163 to the gate of the diagonally opposed MOSFET 183 to provide the above control of torquer coil 34a. Diode network 175 coupled across terminals 173, 174 is a conventional multiple-diode circuit of the type often used in the switching of currents back and forth between various paths as required in the operation of an inductive device, as in the switching of current to or from the appropriate armature coils of an inductive motor or generator.

In the lower bridge-like circuit 178 are two of the VMP-21 MOSFET devices 202 and 203 acting as current regulators. MOSFET 202 is series connected with high range resistor 206 to ground, while MOSFET 203 is series connected with low range resistor 207 to ground. Switches 209,252 and 210,254 are of conventional analog current-switching types and are controlled by the high-low range outputs of flip-flop 122. Switches 209, 252 and 210, 254 are associated with a closed current regulator control loop 260 including a precision voltage source coupled to terminal 240 and an operational amplifier 249.

The apparatus of FIG. 2B meets the requirements of a strapped down flexure inertial rate gyroscope system where precision stable torquing current control is required so that critical demands are made upon current switching bias currents and magnitudes. These needs are met in part by the use of conventional vertical channel MOSFET transistor switching devices. Furthermore, two different current level ranges are required, depending upon whether the system is operating in its high or low range mode.

The structure of the range selection matrix 99 of the lower part of FIG. 1 will now be discussed in further detail. As previously noted, a first input to range selector flip-flop 122 appears on lead 87, while the second is generated by matrix 99. The respective inputs of the latter matrix 99 are from the $Q_3$ through $Q_9$ terminals of counter 84. In an upper part 99a of matrix 99, the $Q_7$, $Q_8$, and $Q_9$ terminals are coupled to inverting inputs of NOR gate 100. The $Q_5$ and $Q_6$ terminals are coupled to inverting inputs of NAND gate 101. The $Q_8$ and $Q_9$ terminals couple to inputs of NAND gate 104. Further, the $Q_5$, $Q_6$, and $Q_7$ terminals coupled to inputs of NOR gate 105. The outputs of gates 100 and 101 couple to the inputs of NAND gate 102, whose inverting output goes to one inverting input terminal of gate 103. The outputs of gates 104, 105 both found on inverting terminals, couple to inputs of OR gate 106, whose output also goes to an inverting input of gate 103. The third inverting input of gate 103, which gate serves as a NAND gate, is derived from the Q, or low range, output of range selection flip-flop 122. The output of NAND gate 103 goes to one input of NAND gate 107, whose output controls the level at the data input D of range selection flip-flop 122. The other lead into NAND gate 107 is controlled by the portion 99b of matrix 99 in the lower part of FIG. 2A. The matrix portion 99a serves to determine when a current range change to the high range is required. The matrix portion 99b serves to change operation back to the low range.

In matrix portion 99a, counter output terminals $Q_5$ and $Q_6$ serve as inputs to NAND gate 109. Terminals $Q_5$ and $Q_6$ also serve as inputs to EXCLUSIVE OR gate 110. Terminals $Q_7$ and $Q_8$ couple to non-inverting inputs of gate 111 and terminal $Q_9$ goes to an inverting input thereof. Although gate 111 has an inverting output, it serves generally as a NAND gate. The inverting output of gate 109 goes to an inverting input of NOR gate 108, whose output is an input of NOR gate 120, and whose other two inverting inputs are respectively supplied with $Q_3$ and $Q_4$ signals. The second input of NOR gate 120 is the output of gate 110. The inputs of the final OR gate 121 are derived from the inverting outputs of NOR gate 120 and of NAND gate 111.

The operation of the range determination and switching logic circuit 99 of FIG. 2A may be best understood by considering specific examples. As stated above, only quantizing pulses corresponding to a positive torquer current are counted. Also, as previously described, the maximum amount of time that the counter can be gated by the 0.01 millisecond clock pulse is 1.8 milliseconds, or 180 pulses per cycle time. Since the counter accumulates counts over five cycle times, the maximum positive pulse count is 900. Therefore, because a 50 percent duty cycle represents a sensed rate of zero, a count of 450 likewise represents a zero rate, while a count of 900 represents a maximum positive rate and a count of zero represents a maximum negative rate. Establishing the criteria that a count of 900 pulses is equal to a maximum low rate of +10 degrees per second and that a count of zero pulses is equal to a maximum low rate of −10 degrees per second, it is evident that high rate range switching should occur at a count somewhat less than 900 and somewhat greater than zero. From the above, a count of 810 to 900 corresponds to a +8 to +10 degrees per second rate, while a count of 90 to zero corresponds to a −8 to −10 degrees per second rate. Therefore, it is desirable to switch to the high rate range for the next 10 milliseconds period whenever a count band of 810 to 900 or 90 to 0 is decoded. Similarly, a criterion for returning to the low rate mode from a high rate mode is established. Assuming that the high rate mode is ±80 degrees per second, a count of 416 to 487 at the end of the 10 millisecond count period would correspond to a rate of approximately −6 to +6 degrees per second. A preferred implementation of decoding logic for performing the high-low range switching according to the invention is illustrated in the lower portion of FIG. 2A. The binary count $Q_3$ to $Q_9$ accumulated in counter 84 over the 10 millisecond period is applied via leads 89 to correspondingly numbered input terminals of decode logic circuit 99, the upper section 99a of which establishes, when satisfied, the high range mode and the lower section 99b of which establishes, when satisfied, the low range mode.

Decode gates 100, 101, and 102 determine negative highs, while gates 104, 105, and 106 determine positive highs. Consider the following three cases of counts from counter 84 applied to gates 100 and 101:

| | $Q_9$ | $Q_8$ | $Q_7$ | $Q_6$ | $Q_5$ | $Q_4$ | $Q_3$ | $Q_2$ | $Q_1$ | $Q_0$ | |
|---|---|---|---|---|---|---|---|---|---|---|---|
| Case 1 | 0 | 0 | 0 | 0 | 1 | X | X | X | X | X | (least significant bits) |
| Case 2 | 0 | 0 | 0 | 1 | 0 | X | X | X | X | X | (X states are |
| Case 3 | 0 | 0 | 0 | 0 | 0 | X | X | X | X | X | immaterial) |

The outputs of gates 100 and 101 will be high, supplying a zero input to gate 103. Note that the decimal equivalents of Case 1 range from 32 to 63 depending on states of the five LSB's; for Case 3 from zero to 31 and for Case 2 from 64 to 95. All of these decimal counts are in the established high rate sensing band zero to 95. For example, a count of 95 corresponds to −7.89 degrees per second. Therefore, gates 100, 101, and 102 decode only the case when a rate of −7.89 to −10 degrees per second is sensed.

When this band is decoded, the output of gate 103 is high, producing a high at one input of NAND gate 107. With the other input to gate 107 high (as will be described) the output of gate 107 goes low, producing a low at the D input of range sense flip-flop 122. At the end of the one millisecond count period, a clock pulse is applied to the C terminal of the flip-flop 122 causing it to reset and producing a high at the $\overline{Q}$ terminal and the high on lead 123b sets the high range switches 252 and 209 of the precision current source of FIG. 2B so that a high current, which in the illustrated embodiment is eight times the low or normal current, is supplied to the gyro torquer. Additionally, with flip-flop 122 reset, the Q terminal thereof will be low and this state is fed back as a third input to gate 103, forcing its output high and thereby latching flip-flop 122 in its reset state. Thus, once the high torque conditions are decoded, the system is latched in this state. The high at $\overline{Q}$ of flip-flop 122 will also set count register 88 via lead 90 into the high mode.

In a similar manner, gates 104, 105, and 106 decode a count corresponding to a high positive rate (when in the low mode). For example, consider a given binary count from counter 84 as follows:

| $Q_9$ | $Q_8$ | $Q_7$ | $Q_6$ | $Q_5$ | $Q_4$ | $Q_3$ | $Q_2$ | $Q_1$ | $Q_0$ |
|---|---|---|---|---|---|---|---|---|---|
| 1 | 1 | 0 | 0 | 1 | 0 | 0 | 0 | 0 | 0 | representing +7.78 degrees per second; gates 104 and 105 each produce a zero input to gate 106. Also, any count within the band 800 to 900 will produce zero inputs to gate 106. Such a zero input to gate 106 will result in a zero level state at gate 103 input, a high input to gate 107, a zero level input at flip-flop terminal D, and a high (switch-to-high range) on lead 123b.

Now, consider the decoding logic 99b circuit and the conditions necessary to force the system back to its normal low rate mode of operation. Tracing the logic gates backward, it is evident that to set flip-flop 122, a high state output from gate 107 is necessary. Thus, the lower input to gate 107 must be a zero and the binary counts corresponding to a predetermined low rate range band when in the high rate mode require decoding logic which results in that zero at the lower input to gate 107. The predetermined low rate range band in the high rate or ±80 degrees per second mode is, in the illustrated embodiment, −6 degrees per second and to +6.5 degrees per second. Consider the following cases which cover this band:

|  | $Q_9$ | $Q_8$ | $Q_7$ | $Q_6$ | $Q_5$ | $Q_4$ | $Q_3$ | $Q_2$ | $Q_1$ | $Q_0$ | Count (X = 0 or 1) | deg./sec. |
|---|---|---|---|---|---|---|---|---|---|---|---|---|
| Case 1 | 0 | 1 | 1 | 1 | 1 | 0 | 0 | X | X | X | 480-487 | +5.33 to +6.50 |
| Case 2 | 0 | 1 | 1 | 0 | 1 | X | X | X | X | X | 416-447 | −6.04 to −0.53 |
| Case 3 | 0 | 1 | 1 | 1 | 0 | X | X | X | X | X | 448-479 | −0.35 to +5.16 |

Note that the high-to-low switching band includes counts 416 to 487, corresponding to −6 degrees per second and to +6.5 degrees per second, respectively, in the high input ±8 degrees per second mode. Gate 111, responsive to the $Q_7$, $Q_8$, and $Q_9$ signals, supplies for all three cases one of the zero inputs to gate 121 required to produce a zero at the lower input of gate 107 when their states are as previously indicated. In order that the other input to gate 121 be a zero, a high at either input to NOR gate 120 is necessary. In Case 1 above, note that $Q_6$ and $Q_5$ are high and that $Q_4$ and $Q_3$ are both low. Thus, in this case, the output of gate 109 is low and the output of gate 108 is high, resulting in the necessary low at the input of gate 107 to switch to the low rate mode, which event, through the action of flip-flop 122, will set the torquer current for its low value. Since the $\overline{Q}$ output of flip-flop 122 is now low, the count register 88 is likewise set to its low rate mode. Note that for Cases 2 and 3, $Q_6$ and $Q_5$ will be alternately low and high which, through EXCLUSIVE OR gate 110, will provide the necessary high at the lower input of gate 120 to result in low range switching regardless of the states of outputs $Q_3$ and $Q_4$.

The operation of the circuits of FIG. 2B may be summarized as follows. The outputs of flip-flop 75 of FIG. 2A, are represented by wave form B of FIG. 3 as limited by the END and CLR pulses of waves D and E. Assume a zero input rate; i.e., the gyro pick-off signal output is zero. The Q and $\overline{Q}$ terminals of flip-flop 75 are high for equal periods of the two millisecond cycle. With the Q terminal high, switches 168 and 190 are conducting, forming a current path from source 169 upward through torquer coil 34a to junctions 200 and 201, through switch 203 (which is now conducting because the low rate range is effective), and through resistor 207 to ground. Note that switch 203 is controlled in a closed loop manner. Switches 210 and 254, being conductive, form a closed voltage loop between the voltage sensed at resistor 207 and the precision reference voltage source 240 and the conducting switch 203. The difference between the sensed voltage and the reference voltage, as determined by operational amplifier 249, adjusts the gate voltage of switch 203 for it to conduct only enough current to make the product of that current and the resistance of resistor 207 equal to the precision reference voltage. In other words, the feed back loop assures a precision current flow through the torquer coil. The operation for rates other than zero degrees per second is similar, except that the on-off times of flip-flop 75 in the positive and negative senses determine the net current flow through the torquer coil. Similarly, for rates in the high mode, the flip-flop 122 effectively opens the low range mode switches 210 and 254 and makes switches 209 and 252 conducting, which action, through operational amplifier 249 and current regulator switch 202, regulates the high torquer current as sensed by the high range mode resistor 206.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use with an inertial sensor of the force rebalance type wherein the current supplied to the sensor torquer required to nullify the sensor pick-off signal indicative of an inertial force acting thereon is proportional to such inertial force, said apparatus comprising:

timing signal generator means for providing a plurality of time related signal frequencies, pulse width modulator means responsive to a first of said timig signal frequencies and to said sensor pick-off signal for providing substantially square wave signal pulses having positive and negative pulse durations proportional to said pick-off signal with a duty cycle corresponding to the period of said first signal frequency, means responsive to said square wave pulses for providing corresponding currents to said sensor torquer in a sense to null said sensor pick-off signal, means responsive to a second of said timing signal frequencies, substantially higher than said first frequency, for quantizing at least one of said cyclic signal pulse durations in accordance with said second frequency, guard band pulse generating means responsive to said first timing signal and coupled with said pulse width modulator means for limiting the maximum and minimum durations of said square wave pulses to predetermined portions of said duty cycle whereby to limit the maximum and minimum pulse durations supplied to said torquer current providing means, and counter means responsive to said quantized pulse duration signal as limited by said pulse generating means for providing a count during the effective pulse duration of said one signal pulse duration.

2. The apparatus as set forth in claim 1 wherein said sensor is adapted for operation in high and low sensing modes, further comprising:

means coupled with current supply means for altering the range of current levels supplied to said torquer means consistent with said high and low sensing ranges, and means responsive to said counter means output for determining said high and low modes of operation and for correspondingly controlling said current level altering means.

3. The apparatus as set forth in claim 1 wherein said pulse width modulator means includes:

ramp signal generator means and wherein said guard band pulse generating means includes:

means responsive to said timing signal generator means for providing a first guard band pulse having a repetitive frequency corresponding to said first timing signal frequency and a pulse width that is a small fraction of said duty cycle, and means responsive to said first guard band pulse for terminating and initiating the ramp signal of said ramp signal generating means whereby to limit the maximum duration of said one square wave pulse supplied to said current supplying means.

4. The apparatus as set forth in claim 3 wherein said guard band pulse generating means further includes:

further means responsive to said timing signal generator means for providing a second guard band pulse having a repetition frequency corresponding to said first timing signal frequency and a pulse width that is a small fraction of said duty cycle, and means responsive to said second guard band pulse for limiting the maximum duration of the other of said square wave pulses supplied to said current providing means.

5. The apparatus as set forth in claim 4 further including logic circuit means responsive to said first and second guard band pulses for supplying said quantizing pulses to said counter means.

6. The apparatus as set forth in claim 5 further comprising counter control means responsive to said first and second guard band pulses for resetting said counter after a predetermined number of duty cycles whereby the quantizing pulse count accumulated by said counter is proportional to the average currents supplied to said torquer over said predetermined number of duty cycles.

7. The apparatus as set forth in claim 3 wherein the pulse width of said first guard band pulse is substantially ten percent of said duty cycle period.

8. The apparatus as set forth in claim 3 wherein the pulse width of each of said first and second guard band pulses is substantially ten percent of said duty cycle period.

9. The apparatus as set forth in claim 3 wherein said pulse width modulator means further comprises synchronizing means responsive to said quantizing pulse frequency for synchronizing the initiation of said square wave pulses with said quantizing pulses.

10. Apparatus for use with an inertial sensor of the force rebalance type operable in a high sensing mode and a low sensing mode wherein the current supplied to the sensor torquer required to nullify the sensor pick-off signal indicative of an inertial force acting thereon is proportional to such inertial force, said apparatus comprising:

timing signal generator means for providing a plurality of time related signal frequencies, pulse width modulator means responsive to a first of said timing signal frequencies and to said sensor pick-off signal for providing substantially square wave signal pulses having positive and negative pulse durations proportional to said pick-off signal with a duty cycle corresponding to said first signal frequency, means responsive to said square wave pulses for providing corresponding currents to said sensor torquer in a sense to null said sensor pick-off signal, means responsive to a second of said timing signal frequencies, substantially higher than said first frequency, for quantizing at least one of said signal pulse durations in accordance with said second frequency, counter means responsive to said quantizing means for providing an output count proportional thereto and hence proportional to said torquer current, means coupled with said current supply means for altering the range of current levels supplied to said torquer means consistent with said high and low sensing modes, and means responsive to said counter output for determining said high and low modes of operation and for correspondingly controlling said current level altering means.

11. The apparatus as set forth in claim 10 wherein said means for determining said high and low sensing modes includes:

decoding means responsive to said counter output for detecting predetermined count bands corresponding to predetermined sensing ranges of said sensor in each of said modes, and logic circuit means responsive to counts outside of said count bands for switching from one mode to the other and vice versa.

12. The apparatus as set forth in claim 11 wherein said logic circuit means includes synchronizing means responsive to said guard band pulses for synchronizing said mode switching with said duration-limited square wave pulses.

13. The apparatus as set forth in claim 11 wherein said decoding means comprises:

first decoding logic means for detecting a count in excess of a first count band in said low sensing mode and for supplying a logic signal to said logic means for establishing said high mode of operation, and second decoding logic means for detecting a count below a second count band in said high sensing mode and for supplying a logic signal to said logic means for re-establishing said low mode of operation.

* * * * *